United States Patent [19]

Hanes

[11] Patent Number: 5,754,848
[45] Date of Patent: May 19, 1998

[54] APPARATUS AND METHOD FOR DISASTER RECOVERY OF AN OPERATING SYSTEM UTILIZING LONG FILE AND DIRECTORY NAMES

[75] Inventor: David H. Hanes, Loveland, Colo.

[73] Assignee: Hewlett-Packard Co., Palo Alto, Calif.

[21] Appl. No.: 712,013

[22] Filed: Sep. 11, 1996

[51] Int. Cl.⁶ ............................................. G06F 17/30
[52] U.S. Cl. ............................................ 395/616; 395/618
[58] Field of Search ........................... 395/616, 618, 395/182.13, 620

[56] References Cited

U.S. PATENT DOCUMENTS 5,202,983  4/1993  Orita et al. ........................ 395/604
5,579,517  11/1996  Reynolds .......................... 395/616
5,627,996  5/1997  Bauer .............................. 395/500

*Primary Examiner*—Thomas G. Black
*Assistant Examiner*—John Loomis
*Attorney, Agent, or Firm*—Patrick J. Murphy

[57] ABSTRACT

An apparatus and method facilitates the conversion of filenames using the conventional 8.3 filename construct and long filenames. A converter is coupled to a software library which permits the running of backup applications from an 8.3 filename system. The library contains internal and external APIs which allow the 8.3 filename system to create files and directories using the long filename convention.

4 Claims, 5 Drawing Sheets

APPARATUS AND METHOD FOR DISASTER RECOVERY OF AN OPERATING SYSTEM UTILIZING LONG FILE AND DIRECTORY NAMES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to operating systems and more particularly to a system and method for disaster recovery of an operating system, the operating system utilizes a long file and directory naming convention.

BACKGROUND OF THE INVENTION

Tape backup systems are provided to protect data files and other information from computer system failures such as hard disk crashes or computer virus attacks. A tape backup system stores this data on off-line media (i.e., the tape); this data can then be retrieved in the event of data loss. An example of a conventional backup system is described in U.S. Pat. No. 5,276,860 entitled "Digital data processor with improved backup storage."

The current trend in operating systems for personal computers is to accommodate long file names. This is thought to give the end-user more flexibility in naming directories and files, as well as provide for more descriptive filing systems. Operating systems which provide a long file naming convention also provide the more standard 8.3 filename convention (sometimes called "short" file names). This facilitates the transition to the newer long filename system as well as providing some backward capabilities for future developments.

A problem with the long filename system is that there is no clean way to provide for disaster recovery. For example, operating systems which use the long filename convention are typically too large and complicated to fit on a single boot disk. The term "disaster recovery" refers to the process an end-user must use to restore the computer's files and directories after experiencing a disk failure. Presently, when a disk failure occurs, the end-user must first re-install the operating system before running a backup application to access data on the backup tape. There is a need in the industry to provide for a more efficient and speedy disaster recovery process for an operating system utilizing a long filename convention.

SUMMARY OF THE INVENTION

The present invention provides an apparatus and method for disaster recovery of an operating system without having to reinstall the operating system. The operating system utilizes long file and directory names. A converter is provided to permit a DOS or Windows-based program to manipulate files between a system using a conventional 8.3 filename construct and a system using long file and directory names. A software library, coupled to the converter, facilitates running backup applications from a 8.3 filename system. The library contains procedures which allow the 8.3 filename system to create files and directories using the long filename convention, thus recovering from a disk failure.

DETAILED DESCRIPTION OF THE PREFERRED EMBODIMENT

Briefly, the present invention provides a system and method for facilitating the manipulation of long file and directory names by a program characterized by the 8.3 filename convention. Application programming interfaces (APIs) are provided so that DOS or Windows-based program can create, delete, read and write files using the long filename convention. Windows is available from Microsoft Corporation, Redmond, Wash.

Figure 1:
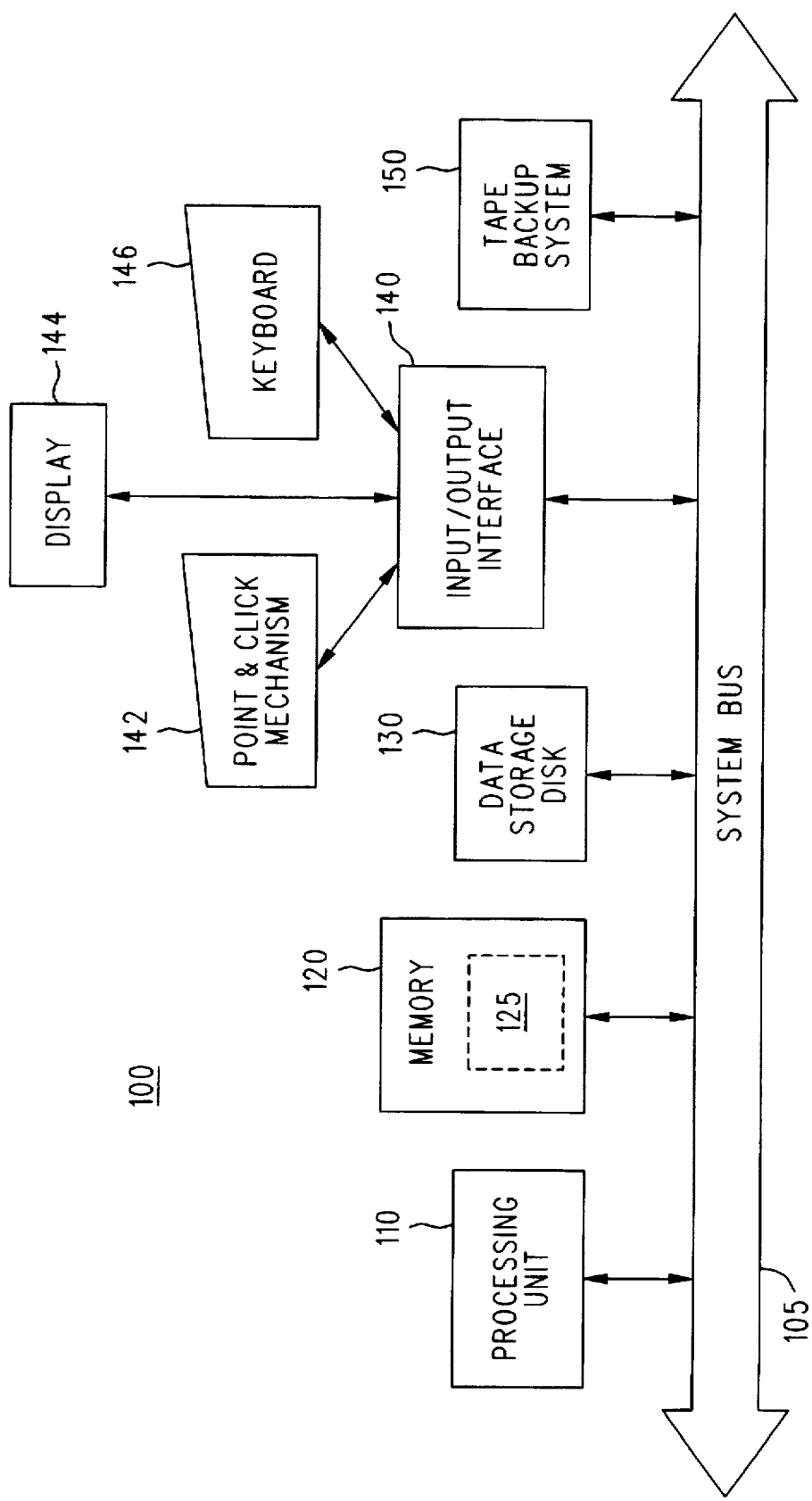
FIG. 1 shows a block diagram of a general purpose digital computer system incorporating the present invention.

FIG. 1 shows a block diagram of a general purpose digital computer system 100 incorporating the present invention. A processing unit 110 is connected to system bus 105. The system bus 105 facilitates communications between the processing unit 110 and memory 120, a data storage disk 130, an input/output interface device 140 and a tape backup system 150. In a preferred embodiment, the memory 120 stores the software of the present invention as well as all data collected and generated by the present invention. In another preferred embodiment, the software may be stored in the data storage disk 130.

An area 125 within the memory 120 is set aside for storage of the present method which is described more fully below. The input/output interface device 140 controls data communications between the bus 105 and a point-and-click mechanism 142 (e.g., a mouse, or a light pen), a display mechanism 144, and a keyboard 146. In a preferred embodiment, the tape backup system 150 can be any number of tape drives available from Hewlett-Packard Company, Palo Alto, Calif., USA, including the Jumbo 1400, Colorado T1000e and Colorado T4000s tape drives.

Figure 2:
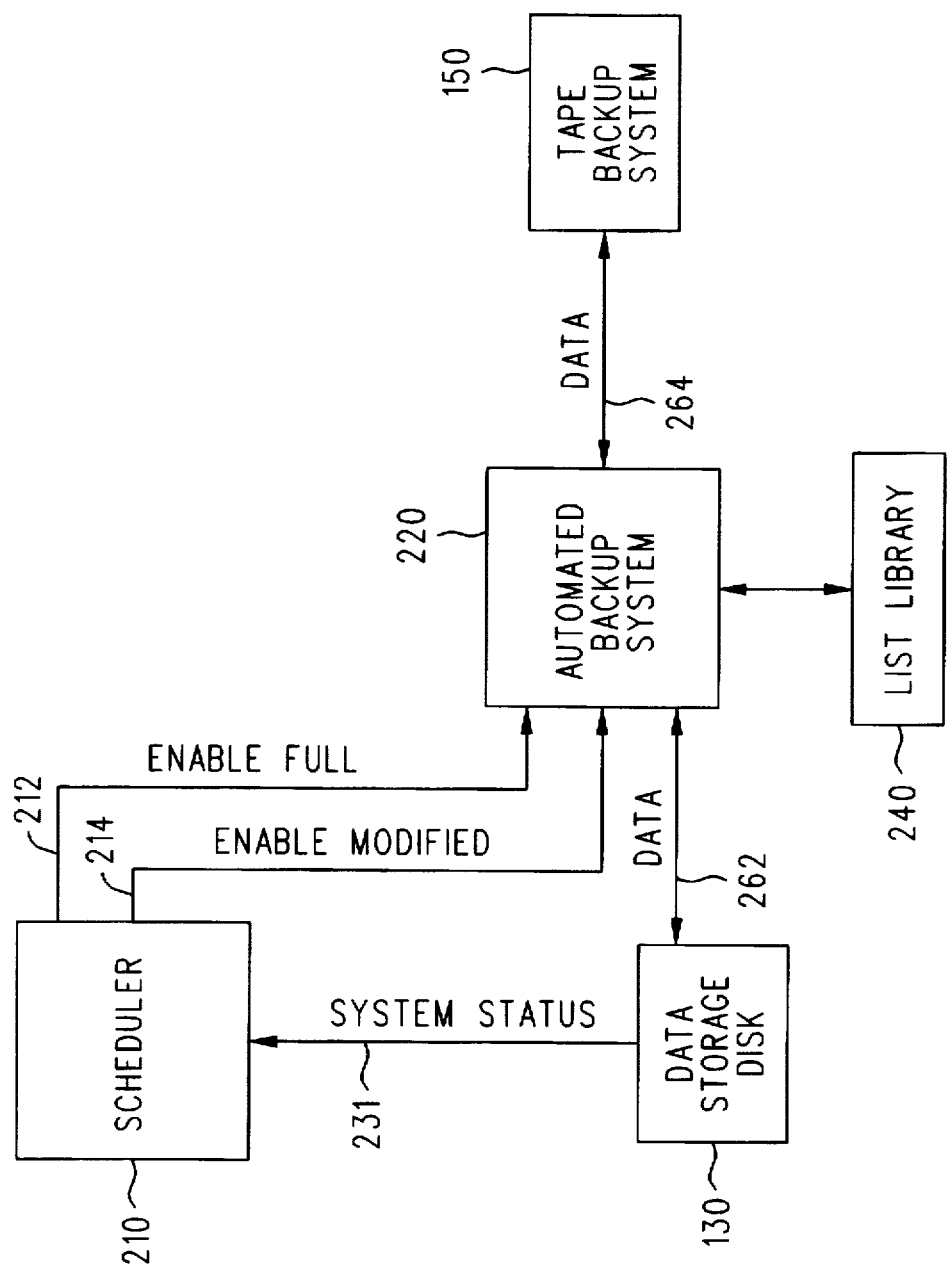
FIG. 2 shows a block diagram of a system for archiving data from a computer system to a tape backup system.

FIG. 2 shows a block diagram of the present system for automatically archiving data from a computer system to a tape backup system. A scheduler 210 controls an automated backup mechanism 220 via control links 212 and 214. The scheduler uses system status information available from a hard disk 230 via link 231 to determine, among other things, what control signal to send to the backup mechanism 220. For example, if the scheduler 210 determines, based upon the system status 231, that a full backup is required, an ENABLE_FULL signal is sent to the backup mechanism 220 via link 212. The ENABLE_FULL signal causes the backup subsystem to make a complete archival copy of the hard disk 230 to the tape backup system 150. An ENABLE_MODIFIED signal is sent via link 214 when an incremental backup is required. In a preferred embodiment, when the automated backup system is installed, a restore disk is created which contains the present method.

Information contained in a list library 240 is used to determine which files to access when the end user requests that the data archived to the tape backup system 150 be restored to the hard disk 230. The scheduler 210 and automated backup mechanism 220 can both be implemented with any suitable logic, for example, as a state machine in a conventional field programmable gate array (FPGA) with the functionality described above. Additionally, both can be implemented in an application-specific integrated circuit (ASIC), using conventional ASIC fabrication techniques.

Figure 3:
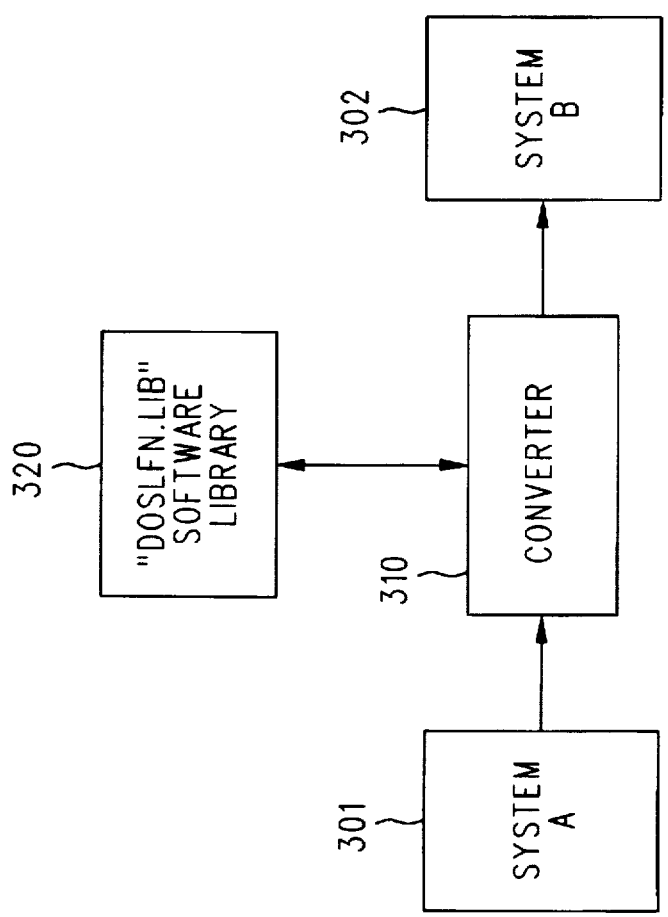
FIG. 3 shows a block diagram of a converter according to the present invention.

FIG. 3 shows a block diagram of the converter according to the present invention. The converter 310 is disposed between system_A 301 and system_B 302. System_A 301 utilizes conventional 8.3 file and directory names; system_B 302 utilizes long file and directory names. In a preferred embodiment, the long file and directory names are compatible with the Windows/95 file system, available from Microsoft Corporation. The Windows/95 file system was implemented to maintain backwards compatibility with the existing FAT[1] file system disk format, supporting both 8.3-based filenames and the long filename convention. A long filename may contain up to 255 characters, not including a trailing NULL character. Long filenames may include embedded spaces and characters not permitted in the more conventional 8.3 filename convention (e.g.,.;,+,;,=). The full path for a long file and/or directory name can be up to 260 characters. Long names are implemented using multiple directory entries.

A "DOSLFN.LIB" software library 320 is coupled to the converter 310. In a preferred embodiment, DOSLFN.LIB is built using the MSC7.0 compiler and the MASM 6.10 assembler. DOSLPN.LIB contains procedures which allow the 8.3 filename system to create files and directories using the long filename convention. The converter 310 permits a DOS or Windows-based program to create, delete, open, read and write files and directories from system_A 301 to system_B 302.

Figure 4:
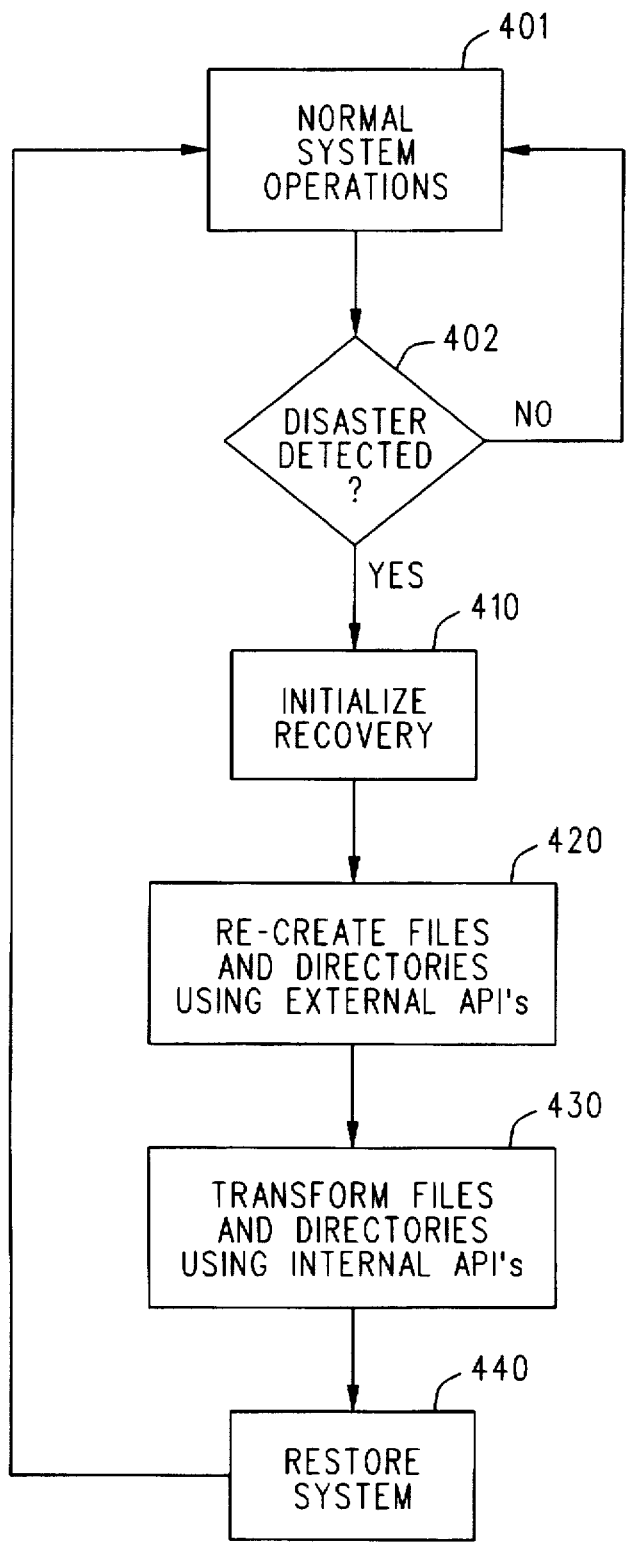
FIG. 4 shows a flow chart of the overall flow of the method according to the present invention.

FIG. 4 shows a flow chart of the overall flow of the method according to the present invention. A computer system, such as item 100 in FIG. 1, operates normally at block 401. A poll is taken at decision block 402 to determine if a disaster has occurred. If nothing disastrous has occurred, block 401 maintains control of the system. If a disaster is detected, block 410 initializes a recovery procedure. Block 420 first recreates the files and directories using external API's contained in DOSLFN.LIB. These files and directories are then transformed by block 430 using the internal API's from DOSLFN.LIB. Appendix A contains both the external and internal API's according to the present invention. Finally, block 440 restores the system and passes control back to block 401.

Figure 5:
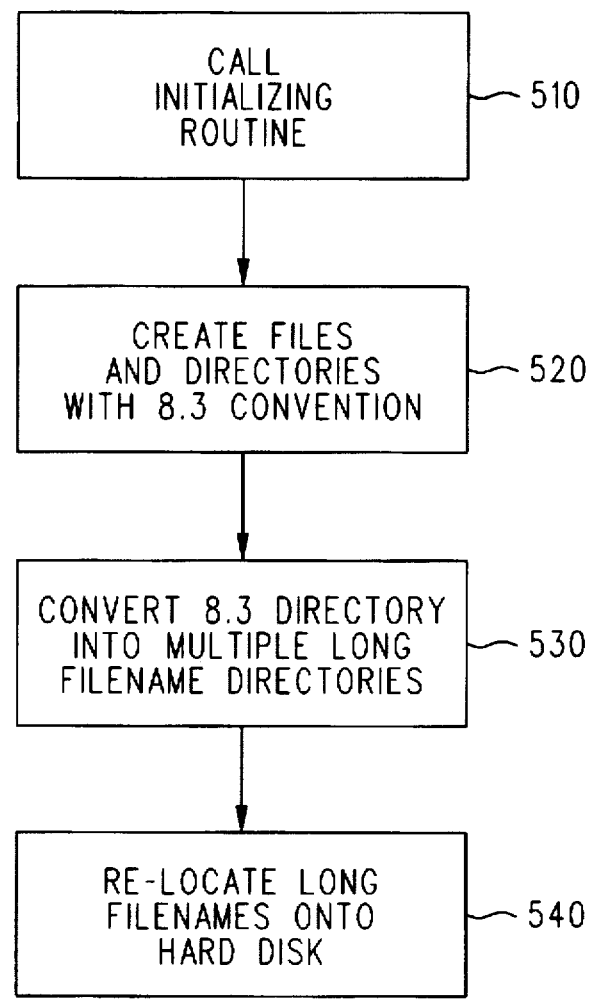
FIG. 5 shows a more detailed flow chart of the present method.

FIG. 5 shows a more detailed flow chart of the present method. Block 510 calls the initializing routine, doslfn_Initialize(). This routine allocates memory, initializes variables and creates a unique subdirectory immediately off the root disk directory. This subdirectory is used as a temporary storage location to create files and directories before file relocation as discussed below.

After doslfn_Initialize() is called, block 520 creates files and directories using the 8.3 filename convention. DOSLFN.LIB is implemented so as to take advantage of the underlying DOS file and directory functions where possible. Thus, block 520 utilizes DOS functions to create the files and directories with 8.3 filenames. These newly created files and directories are stored in the temporary subdirectory created by doslfn_Initialize().

Block 530 converts each 8.3 directory entry into multiple directory entries using the long filename convention. Once the long filename directory entries are created, block 540 relocates these entries down to the correct location on the disk to reflect the long path where the multiple directories entries belong. This is accomplished by dividing the desired path into separate path elements and then locating each path element by searching for their associated directory entry. For example, suppose one needs to restore the file "\A\B\C\a long filename". The present method would divide this into two basic elements: the path "\A\B\C"; and the file "a long filename". An updated cluster number is maintained to determine the destination cluster where the long file and directory name entries should be placed. Each of the steps are then repeated until each of the files that need to be restored are.

While the present invention has been illustrated and described in connection with the preferred embodiment, it is not to be limited to the particular structure shown. It should be understood by those skilled in the art that various changes and modifications may be made within the purview of the appended claims without departing from the spirit and scope of the invention in its broader aspects.

APPENDIX A— EXTERNAL AND INTERNAL APPLICATION PROGRAMMING INTERFACES

External API Definitions

WORD far doslfn_Initialize (drive_number)
char drive_number;
Parameters: *drive_number*
                Identifies the drive number on which the DOSLFN library will be creating/manipulating long names. Drive A:=0, B:=1, etc.
Return Value: The Return value is SUCCESS (00h) if successful, otherwise a non-zero value is returned. The valid return values are as follows:
SUCCESS              0x0     The function was successful
GENERAL_ERROR        0xFF    The function failed.
Comments: This initialize routine must be called by the application once, prior to making any other DOSLFN API calls. This routine allocates memory, and reads disk parameters for the specified drive.

WORD far doslfn_Terminate (void)
Parameters: None.
Return Value: The Return value is SUCCESS (00h) if successful, otherwise a non-zero value is returned. The valid return values are as follows:
SUCCESS              0x0     The function was successful
GENERAL_ERROR        0xFF    The function failed.
Comments: This terminate routine must be called by the application once to stop the DOSLFN services. This gives the DOSLFN library a chance to de-allocate any memory and perform other general cleanup tasks.

WORD far doslfn_MakeDirectory (full_path, short_name)
char far * full_path;
char far * short_name;
Parameters: *full_path*
                A far pointer to the full path where the directory should be created. Only one directory can be created at a time, so only the last component of the *full_path* can name a new directory.
            *short_name*
                A far pointer to an ASCIIZ, short (DOS 8.3) filename which is associated with the long subdirectory which is being created. If the *short_name* pointer is NULL (0x0), a short name will be auto-generated. Please note that this auto-generation feature will not be used in our Disaster Recovery application. The auto-generation rules are not fully implemented.
Return Value: The Return value is SUCCESS (00h) if successful, otherwise a non-zero value is returned. The valid return values are as follows:
SUCCESS                  0x0     The function was successful.
ERROR_PATH_NOT_FOUND     0x3     An element in the path does not exist.
ERROR_ACCESS_DENIED      0x5     The specified subdirectory already exists.
ERROR_WRITE_FAULT        0x1D    An error occurred writing to the disk.
ERROR_READ_FAULT         0x1E    An error occurred reading from the disk.
GENERAL_ERROR            0xFF    The function failed.
Comments: This function creates the specified subdirectory. The subdirectory name must conform to the Windows/95 directory naming rules.

WORD far doslfn_CreateFile (full_path, short_name, attributes, handle)
char far * full_path;

```
            char far * short_name;
            WORD attributes;
            WORD far * handle;
            Parameters:    full_path
                                   A far pointer to the full path to where this file should be created. If specifying
                                   a path with multiple subdirectories, each element of the subdirectory structure
                                   must exist for this call to succeed, otherwise an error will be returned.
                           short_name
                                   A far pointer to an ASCIIZ, short (DOS 8.3) filename which is associated with
                                   the long file name which is being created. If the short_name pointer is NULL
                                   (0x0), a short name will be auto-generated. Please note that this auto-generation
                                   feature will not be used in our Disaster Recovery application. The auto-
                                   generation rules are not fully implemented.
                           attribute
                                   Contains one or more of the following file attributes to be associated with the
                                   file.
                                   0x00 - Normal file
                                   0x01 - Read only file
                                   0x02 - Hidden file
                                   0x04 - System file
                                   0x20 - Archive file
                           handle
                                   This parameter is not used on input. A far pointer to a unsigned integer
            which
                                   will receive the file handle from the newly created file. This handle can be
                                   used as a parameter to C-run time library routines to read and/or write to the
                                   file.
            Return Value:  The Return value is SUCCESS (00h) if successful, otherwise a non-zero value is
                           returned. The valid return values are as follows:
                           SUCCESS                   0x0    The function was successful.
                           ERROR_PATH_NOT_FOUND      0x3    An element in the path does not exist.
                           ERROR_WRITE_FAULT         0x1D   An error occurred writing to the disk.
                           ERROR_READ_FAULT          0x1E   An error occurred reading from the disk.
                           GENERAL_ERROR             0xFF   The function failed.
            Comments:      This function creates the specified file if it does not exist. If the file does already exist,
                           the file is opened, and it's contents will be overwritten. (Note that this function differs
                           from the dos_creat() behavior, dos_creat() will fail if the file already exists.) This
                           function returns a handle to the file which is compatible with any C-run time library or
                           DOS function which accepts a file handle, i.e. read/write, setftime, etc. The filename at
                           the end of full_path must conform to the Windows/95 file naming rules.
                           Note:  The application MUST use doslfn_CloseFile() to close a file created with
                           doslfn_CreateFile(). If this is not done, the long file name information will not be
                           properly stored on disk.

WORD far doslfn_CloseFile (handle)
            WORD handle;
            Parameters:    handle
                                   Identifies the file handle to close, this should be a file handle that was returned
                                   from a doslfn_CreateFile() call.
            Return Value:  The Return value is SUCCESS (00h) if successful, otherwise a non-zero value is
                           returned. The valid return values are as follows:
                           SUCCESS                   0x0    The function was successful.
                           ERROR_WRITE_FAULT         0x1D   An error occurred writing to the disk.
                           ERROR_READ_FAULT          0x1E   An error occurred reading from the disk.
```

| | GENERAL_ERROR | 0xFF | The function failed. |

Comments: This function closes an open file that was created from a doslfn_CreateFile() call.

WORD far doslfn_DeleteFile (full_path)
char far * full_path;
Parameters: *full_path*
A far pointer to the full path of the file to be deleted. If specifying a path with multiple subdirectories, each element of the subdirectory structure must exist for this call to succeed, otherwise an error will be returned.

Return Value: The Return value is SUCCESS (00h) if successful, otherwise a non-zero value is returned. The valid return values are as follows:

| SUCCESS | 0x0 | The function was successful. |
| --- | --- | --- |
| ERROR_FILE_NOT_FOUND | 0x2 | The specified files does not exist. |
| ERROR_PATH_NOT_FOUND | 0x3 | An element in the path does not exist. |
| ERROR_WRITE_FAULT | 0x1D | An error occurred writing to the disk. |
| ERROR_READ_FAULT | 0x1E | An error occurred reading from the disk. |
| GENERAL_ERROR | 0xFF | The function failed. |

Comments: This function deletes the the specified file.
The filename at the end of *full_path* must conform to the Windows/95 file naming rules.

WORD far doslfn_SetAttribute (full_path, attribute)
char far * full_path;
WORD attribute;
Parameters: *full_path*
A far pointer to the full path specifying the file or subdirectory on which to modify attributes. If specifying a path with multiple subdirectories, each element of the subdirectory structure must exist for this call to succeed, otherwise an error will be returned.

*attribute*
Contains one or more of the following file attributes to be associated with the file.
0x00 - Normal
0x01 - Read only
0x02 - Hidden
0x04 - System
0x20 - Archive Return Value: The Return value is SUCCESS (00h) if successful, otherwise a non-zero value is returned. The valid return values are as follows:

| SUCCESS | 0x0 | The function was successful. |
| --- | --- | --- |
| ERROR_FILE_NOT_FOUND | 0x2 | The specified files does not exist. |
| ERROR_PATH_NOT_FOUND | 0x3 | An element in the path does not exist. |
| ERROR_WRITE_FAULT | 0x1D | An error occurred writing to the disk. |
| ERROR_READ_FAULT | 0x1E | An error occurred reading from the disk. |
| GENERAL_ERROR | 0xFF | The function failed. |

Comments: This function modifies the attributes of the specified file or subdirectory.
The file/subdirectory name at the end of *full_path* must conform to the Windows/95 file naming rules.

WORD far doslfn_FindFile (full_path, attributes)
char far * full_path;
FILE_ATTRIBUTE far *file_attributess;
Parameters: *full_path*
A far pointer to the full path of the file/subdirectory to locate. If the file does not exist, ERROR_FILE_NOT_FOUND will be returned. If specifying a path with multiple subdirectories, each element of the subdirectory structure must exist for this call to succeed, otherwise ERROR_PATH_NOT_FOUND will be returned. If the file/subdirectory exists, the attribute structure will be filled out.

*file_attributes*
A far pointer to the following structure:
```
typedef struct FILE_ATTRIBUTE_STRUCT {
    unsigned char   attributes;
    DWORD           size;
    WORD            date;
    WORD            time;
} FILE_ATTRIBUTE;
```
If the function call is successful, the structure will be filled out, otherwise, the contents are undetermined.

The fields have the following meaning:

*attributes*
Contains one or more of the following file attributes to be associated with the file.
0x00 - Normal
0x01 - Read only
0x02 - Hidden
0x04 - System
0x20 - Archive

*size*
An unsigned long, containing the file size in bytes.

*date*
A 16-bit value with the following format:
Bits 0-4:           Day of the month (1-31).
Bits 5-8:           Month (1=January, 2=February, etc).
Bits 9-15:          Year offset from 1980 (add 1980 to get actual year).

*time*
A 16-bit value with the following format:
Bits 0-4:           Second divided by 2.
Bits 5-10:          Minute (0-59).
Bits 11-15:         Hour (0-23 on a 24-hour clock).

Return Value: The Return value is SUCCESS (00h) if successful, otherwise a non-zero value is returned. The valid return values are as follows:

| | | |
|---|---|---|
| SUCCESS | 0x0 | The function was successful. |
| ERROR_FILE_NOT_FOUND | 0x2 | The specified files does not exist. |
| ERROR_PATH_NOT_FOUND | 0x3 | An element in the path does not exist. |
| ERROR_WRITE_FAULT | 0x1D | An error occurred writing to the disk. |
| ERROR_READ_FAULT | 0x1E | An error occurred reading from the disk. |
| GENERAL_ERROR | 0xFF | The function failed. |

Comments: This function determines if the specified file/subdirectory exists. If it does exist, the *file_attributes* structure will be filled out, otherwise an error will be returned. The filename at the end of *full_path* must conform to the Windows/95 file naming rules.

Internal API Definitions

WORD far doslfn_ReadSectors (drive_number, starting_sector, number_sectors, buffer)
char drive_number;
DWORD starting_sector;

```
int number_sectors;
char far * buffer;
Parameters:    drive_number
                   Identifies the drive number from which to read sectors.  Drive A:=0, B:=1,
               etc.
               starting_sector
                   The starting logical sector number to begin reading at.
               number_sectors
                   Specifies the number of sectors to read in.
               buffer
                   A far pointer to a buffer to read the data in to.  It is the caller's responsibility
                   to ensure that this buffer is large enough to hold all of the requested sectors.
Return Value:  The Return value is SUCCESS (00h) if successful, otherwise a non-zero value is
               returned.  The valid return values are as follows:
               SUCCESS                     0x0    The function was successful.
               ERROR_READ_FAULT            0x1E   An error occurred reading from the disk.
               GENERAL_ERROR               0xFF   The function failed.
Comments:      The caller must ensure that the buffer passed in is large enough to hold
               (number_sectors * number of bytes per sector).  This function will use Int 25h to read
               in the logical sectors.  In the case of the new FAT-32 file system, this function will use
               the new Ext_ABSDiskReadWrite function (INT 21h, AX=7305h).

WORD far doslfn_WriteSectors (drive_number, starting_sector, number_sectors, fat32_hint,
                              buffer)
char drive_number;
DWORD starting_sector;
int number_sectors;
WORD fat32_hint;
char far * buffer;
Parameters:    drive_number
                   Identifies the drive number to write sectors to.  Drive A:=0, B:=1, etc.
               starting_sector
                   The starting logical sector number to begin writing at.
               number_sectors
                   Specifies the number of sectors to write.
               fat32_hint
                   Only used for FAT32 file system implementation.  This specifies the type of
                   data being written.  The possible choices are:
                   FAT32_HINT_UNKNOWN       Data type is unknown.
                   FAT32_HINT_FAT_DATA      FAT data.
                   FAT32_HINT_DIR_DATA      Directory data.
                   FAT32_HINT_NORMAL_DATA   Normal file data.
                   FAT32_HINT_RESERVED      Reserved.
               buffer
                   A far pointer to a buffer which contains the data to write.  It is the caller's
                   responsibility to ensure that this buffer contains enough data to write all of the
                   requested sectors.
Return Value:  The Return value is SUCCESS (00h) if successful, otherwise a non-zero value is
               returned.  The valid return values are as follows:
               SUCCESS                     0x0    The function was successful.
               ERROR_WRITE_FAULT           0x1D   An error occurred writing to the disk.
               GENERAL_ERROR               0xFF   The function failed.
Comments:      This function uses Int 26h to write the logical sectors.
```

In the case of the new FAT-32 file system, this function will use the new Ext_ABSDiskReadWrite function (INT 21h, AX=7305h).

WORD far doslfn_ReadCluster (drive_number, starting_cluster, buffer)
char drive_number;
CLUSTER starting_cluster;
char far * buffer;

Parameters: *drive_number*
 Identifies the drive number from which to read a cluster. Drive A:=0, B:=1, etc.
*starting_cluster*
 The logical cluster number to read in.
*buffer*
 A far pointer to a buffer to fill in with the specified cluster's data. It is the caller's responsibility to ensure that this buffer is large enough to hold an entire cluster.

Return Value: The Return value is SUCCESS (00h) if successful, otherwise a non-zero value is returned. The valid return values are as follows:
| | | |
|---|---|---|
| SUCCESS | 0x0 | The function was successful. |
| ERROR_READ_FAULT | 0x1E | An error occurred reading from the disk. |
| GENERAL_ERROR | 0xFF | The function failed. |

Comments: This function uses doslfn_ReadSectors to read in the appropriate number of sectors that comprise a cluster. The caller must ensure that the buffer passed in is sufficiently large to hold one cluster's worth of data.

WORD far doslfn_WriteCluster (drive_number, starting_cluster, fat32_hint, buffer)
char drive_number;
CLUSTER starting_cluster;
WORD fat32_hint;
char far * buffer;

Parameters: *drive_number*
 Identifies the drive number that we wish to write to. Drive A:=0, B:=1, etc.
*starting_cluster*
 The logical cluster number to write to.
*fat32_hint*
 Only used for FAT32 file system implementation. This specifies the type of data being written. The possible choices are:
| | |
|---|---|
| FAT32_HINT_UNKNOWN | Data type is unknown. |
| FAT32_HINT_FAT_DATA | FAT data. |
| FAT32_HINT_DIR_DATA | Directory data. |
| FAT32_HINT_NORMAL_DATA | Normal file data. |
| FAT32_HINT_RESERVED | Reserved. |

*buffer*
 A far pointer to a buffer which contains the data to write. It is the caller's responsibility to ensure that this buffer contains enough data to fill an entire cluster.

Return Value: The Return value is SUCCESS (00h) if successful, otherwise a non-zero value is returned. The valid return values are as follows:
| | | |
|---|---|---|
| SUCCESS | 0x0 | The function was successful. |
| ERROR_WRITE_FAULT | 0x1D | An error occurred writing to the disk. |
| GENERAL_ERROR | 0xFF | The function failed. |

Comments: This function uses doslfn_WriteSectors to write out the appropriate number of sectors that comprise a cluster. The caller must ensure that the buffer passed contains one cluster's worth of data.

WORD far doslfn_UseNewDiskAPI (void)

| | |
|---|---|
| Parameters: | None. |
| Return Value: | The Return value is TRUE (01h) if the operating system supports the new Disk I/O API, and FALSE (00h) if it does NOT support the new Disk I/O API. |
| Comments: | This routine is used to determine if subsequent Disk I/O calls should use the new API (Int 21h/7305h) or the older Int 25h/Int 26h APIs. Newer versions of Windows 95 disable the old Int 25h/Int 26h APIs, and so our code must support both interfaces. This routine tries the newer Int 21h/7305h interface first. If we do not get an error back, we set a flag which indicates that all Disk I/O will use this new interface. If we do get an error back, we use the older Int 25h/Int 26h method. |

WORD far doslfn_LockDrive (drive_number)
char drive_number;

| | |
|---|---|
| Parameters: | *drive_number* Identifies the drive number to lock. Drive A:=1, B:=2, etc. |
| Return Value: | The Return value is SUCCESS (00h) if successful, otherwise a non-zero value is returned. The valid return values are as follows:<br>SUCCESS          0x0     The drive was successfully locked.<br>GENERAL_ERROR    0xFF    The function failed. The drive is not locked. |
| Comments: | This routine must be called to issue a "lock logical volume" call to the operating system. If this is not performed, the Windows 95 version of DOS, will issue an error message to the user, and will halt the system. When the caller is finished doing low-level I/O to this drive, a call to doslfn_UnlockDrive() must be made. |

WORD far doslfn_UnockDrive (drive_number)
char drive_number;

| | |
|---|---|
| Parameters: | *drive_number* Identifies the drive number to unlock. Drive A:=1, B:=2, etc. |
| Return Value: | The Return value is SUCCESS (00h) if successful, otherwise a non-zero value is returned. The valid return values are as follows:<br>SUCCESS          0x0     The drive was successfully unlocked.<br>GENERAL_ERROR    0xFF    The function failed, drive remains locked. |
| Comments: | This routine is the counterpart to the doslfn_LockDrive() function. This routine issues an "unlock logical volume" call to the operating system. This routine must be called after doslfn_LockDrive() is called. Additionally, it is important to note that the low-level Disk I/O routines CANNOT be called after this routine is called. Failure to follow these rules will cause the operating system to display an error message to the user, and halt the system. |

WORD far doslfn_ReadBPB (drive_number)
char drive_number;

| | |
|---|---|
| Parameters: | *drive_number* Identifies the drive number from which to read the BIOS parameter block. Drive A:=0, B:=1, etc. |
| Return Value: | The Return value is SUCCESS (00h) if successful, otherwise a non-zero value is returned. The valid return values are as follows:<br>SUCCESS              0x0     The function was successful.<br>ERROR_READ_FAULT     0x1E    An error occurred reading from the disk.<br>GENERAL_ERROR        0xFF    The function failed. |
| Comments: | This function reads in the specified drive's BIOS parameter block (BPB), and uses it's | values to set some global variables that are used throughout the code. This routine is
called by the doslfn_Initialize () routine.

WORD far doslfn_ReadDPB (drive_number, dpb_buffer, dpb_buffer_size)
char drive_number;
DPB far * dpb_buffer;
WORD dpb_buffer_size;
Parameters:   *drive_number*
              Identifies the drive number from which to read the drive parameter block.
              Drive A:=0, B:=1, etc.
              *dpb_buffer*
              A far pointer to a buffer which this routine will fill in with the specified drive's
              DPB information. It is the caller's responsibility to ensure that this buffer is of
              sufficient size to hold the DPB. Note that for if the specified drive has a FAT32
              file system, the DPB is larger than the FAT16 DPB.
              *dpb_buffer_size*
              Specifies the size of *dpb_buffer* (in bytes). This routine will only put this
              number of bytes into *dpb_buffer*.
Return Value: The Return value is SUCCESS (00h) if successful, otherwise a non-zero value is
              returned. The valid return values are as follows:
              SUCCESS              0x0     The function was successful.
              GENERAL_ERROR        0xFF    The function failed.
Comments:     This function reads in the specified drive's "drive parameter block" (DPB), and uses it's
              values to set some global variables that are used throughout the code. This routine is
              called by the doslfn_Initialize () routine.

WORD far doslfn_SearchForShortElement (drive_number, filename, buffer, cluster,
                                        dir_cluster, userptr, buffer_damaged)
char drive_number;
char far *filename;
SHORT_DIR_ENTRY far *buffer;
CLUSTER far *cluster;
CLUSTER far *dir_cluster;
SHORT_DIR_ENTRY far * far *userptr;
WORD far *buffer_damaged;
Parameters:   *drive_number*
              Identifies the drive number on which the search function is to be conducted.
              Drive A:=0, B:=1, etc.
              *filename*
              The filename (or path element) to search for. This is not a full-path, this is only
              an 8.3 filename. We do not need to have the entire path, since the it is the
              caller's responsibility to parse the full path into separate path elements, and call
              this routine for each element to locate it's directory entry and cluster number.
              *buffer*
              Points to a buffer which contains the initial set of directory entries to search.
              The contents of this buffer may be modified, as this routine reads in subsequent
              clusters (when following the FAT allocation chain). It is the caller's
              responsibility to ensure that this buffer is large enough to hold 1 complete
              cluster.
              *cluster*
              A far pointer to the cluster number to begin the search (the same cluster that
              was used to fill in the *buffer*).
              This cluster number may be modified, as this routine reads in subsequent
              clusters (when following the FAT allocation chain).

*dir_cluster*
    A far pointer to a variable which, on exit, will be set to the cluster number that contains the directory entry for the specified *filename*. Note that this is different from the above *cluster* parameter, which will contain the first DATA cluster of the specified *filename*.

*userptr*
    A far pointer to the caller's far pointer. This parameter is not used on input. Upon exit, it is adjusted to point to the appropriate point in the *buffer* where a match occurs.
    If an error occurs, this value is undefined and must not be accessed.

*buffer_damaged*
    A far pointer to a variable which, on exit, will indicate if the *buffer* contents have been damaged. If set to TRUE (0x1), the contents of *buffer* have been damaged, FALSE (0x0) indicates the *buffer* has the contents of the original *cluster* value.

Return Value: The Return value is SUCCESS (00h) if successful, otherwise a non-zero value is returned. The valid return values are as follows:

| | | |
|---|---|---|
| SUCCESS | 0x0 | The function was successful. |
| ERROR_READ_FAULT | 0x1E | An error occurred reading from the disk. |
| GENERAL_ERROR | 0xFF | The function failed. |

Comments: This function searches the directory entries contained in *buffer* looking for the short (8.3) *filename*. If a match is found, *userptr* is updated to point to the spot in buffer where the directory entry begins. If no match is found, an error is returned to the caller.
This routine may modify the contents of *buffer*, as it follows the FAT allocation chain during its search. If this occurs, the *buffer_damaged* flag will be set to TRUE (0x1).

WORD far doslfn_SearchForLongElement (drive_number, filename, buffer, cluster, userptr)
char drive_number;
char far *filename;
LONG_DIR_ENTRY far *buffer;
CLUSTER far *cluster;
CLUSTER far *dir_cluster;
LONG_DIR_ENTRY far * far *userptr;
WORD far *cluster_spanned;
CLUSTER far *spanned_cluster_number;
WORD far *buffer_damaged;

Parameters:  *drive_number*
    Identifies the drive number on which the search function is to be conducted. Drive A:=0, B:=1, etc.

*filename*
    The filename (or path element) to search for. This is not a full-path, this is only a long filename. We do not need to have the entire path, since the it is the caller's responsibility to parse the full path into separate path elements, and call this routine for each element to locate it's directory entry and cluster number.

*buffer*
    Points to a buffer which contains the initial set of directory entries to search. The contents of this buffer may be modified, as this routine reads in subsequent clusters (when following the FAT allocation chain). It is the caller's responsibility to ensure that this buffer is large enough to hold 1 complete cluster.

*cluster*
    A pointer to the cluster number to begin the search (the same cluster that was used to fill in the *buffer*).

This cluster number may be modified, as this routine reads in subsequent clusters (when following the FAT allocation chain).

*dir_cluster*

A far pointer to a variable which, on exit, will be set to the cluster number that contains the directory entry for the specified *filename*. Note that this is different from the above *cluster* parameter, which will contain the first DATA cluster of the specified *filename*.

*userptr*

A far pointer to the caller's far pointer. This parameter is not used on input. Upon exit, it is adjusted to point to the appropriate point in the *buffer* where a match occurs.

If an error occurs, this value is undefined and must not be accessed.

*cluster_spanned*

A far pointer to a variable which, on exit, will indicate if the specified *filename* spans more than one cluster's worth of directory entries. If set to TRUE (0x1), the directory entries which make up *filename*, cross a cluster boundary. In this case, the *spanned_cluster_number* parameter will be set to the cluster number which contains partial directory entries for *filename*. FALSE (0x0) indicates that *filename* fits entirely with the cluster specified by the *cluster* parameter.

*spanned_cluster_number*

A far pointer to a variable which, on exit, may contain the cluster number of a second cluster of directory entries. If the *cluster_spanned* parameter is set to TRUE (0x1), the directory entries for *filename* span more than one cluster. The *spanned_cluster_number* parameter is then set to the cluster number of the second cluster of directory entries. If *cluster_spanned* is FALSE (0x0) this parameter has an undefined value.

*buffer_damaged*

A far pointer to a variable which, on exit, will indicate if the *buffer* contents have been damaged. If set to TRUE (0x1), the contents of *buffer* have been damaged, FALSE (0x0) indicates the *buffer* has the contents of the original *cluster* value.

Return Value: The Return value is SUCCESS (00h) if successful, otherwise a non-zero value is returned. The valid return values are as follows:

| | | |
|---|---|---|
| SUCCESS | 0x0 | The function was successful. |
| ERROR_READ_FAULT | 0x1E | An error occurred reading from the disk. |
| GENERAL_ERROR | 0xFF | The function failed. |

Comments: This function searches the directory entries contained in *buffer* looking for the long name specified in *filename*. If a match is found, *userptr* is updated to point to the spot in buffer where the directory entry begins. If no match is found, an error is returned to the caller.

This routine may modify the contents of *buffer* as it follows the FAT allocation chain during its search. If this occurs, the *buffer_damaged* flag will be set to TRUE (0x1).

WORD far doslfn_LongNameToDirEntry (path, long_file_name, short_file_name, buffer, num_filled)

char far *path;
char far *long_file_name;
char far *short_file_name;
LONG_DIR_ENTRY far *buffer;
WORD far *num_filled;

Parameters: *path*

A far pointer to the full path to where this file resides. This path must NOT

- 16 - include the file name. Currently this path parameter is only used in auto-generating the associated 8.3 short file name. This functionality may not be needed, and this parameter may go away.

*long_file_name*
 A far pointer to the long file name which needs to be converted into directory entries. The directory entries that are created from this long name are put in *buffer*.

*short_file_name*
 A far pointer to an ASCIIZ, short (DOS 8.3) filename which is associated with the *long_file_name*. If the *short_file_name* pointer is NULL (0x0), a short name will be auto-generated. Please note that this auto-generation feature will not be used in our Disaster Recovery application. The auto-generation rules are not fully implemented.

*buffer*
 A far pointer to a buffer. This parameter is not used as input. This routine uses the *long_file_name* and converts it to a series of directory entries which are compatible with Windows/95.

*num_filled*
 A pointer to an unsigned int. This parameter is not used as input. This routine will fill in the unsigned int with the number of bytes that were stored in *buffer*.

Return Value: The Return value is SUCCESS (00h) if successful, otherwise a non-zero value is returned. The valid return values are as follows:

| | | |
|---|---|---|
| SUCCESS | 0x0 | The function was successful. |
| ERROR_READ_FAULT | 0x1E | An error occurred reading from the disk. (This error can only occur if auto short name generation is used). |
| GENERAL_ERROR | 0xFF | The function failed. |

Comments: This routine takes the specified *long_file_name* and converts it to 1 or more directory entries (it puts these directory entries in the *buffer* passed in as a parameter). This routine assumes that the caller has allocated a *buffer* large enough to hold the entire name. The longest "long name" is 256 bytes, which is 512 bytes of unicode space. Each "long name" directory entry holds 13 unicode characters. Therefore, the longest name can take 40 directory entries. 40 directory entries will take 1280 bytes, so a buffer of this size will be sufficient (as long as Microsoft doesn't extend the long file name spec to handle names longer than 256 characters!).

WORD far doslfn_DirEntryToLFN
LONG_DIR_ENTRY far *buffer;
char far *long_file_name;

Parameters: *buffer*
 A far pointer to a buffer which contains a series of long name directory entries. This routine examines the directory entries in the buffer and reconstructs an ASCIIZ representation of the long name and stores the result in the *long_file_name* string.

*long_file_name*
 A far pointer to a string which will hold the ASCIIZ representation of the long name stored in the directory entries in *buffer*. It is the caller's responsibility to ensure that this string is large enough to hold the entire long name.

Return Value: The Return value is SUCCESS (00h) if successful, otherwise a non-zero value is returned. The valid return values are as follows:

| | | |
|---|---|---|
| SUCCESS | 0x0 | The function was successful. |
| GENERAL_ERROR | 0xFF | The function failed. |

Comments: This routine takes the specified *buffer* and converts it from a series of directory entries back to an ASCIIZ representation of the long name. This ASCIIZ representation is then stored in the *long_file_name* string. This routine assumes that the caller has allocated a string large enough to hold the entire long name. A string length of 261 is sufficient to hold the longest possible name.

WORD far doslfn_NumberDirEntries (long_file_name)
char far *long_file_name
Parameters:    *long_file_name*
        A far pointer to a long file or directory name. This name should be in ASCIIZ format.
Return Value:    The Return value is the number of directory entries required to hold the specified *long_file_name*.
Comments:    This routine takes the specified *long_file_name* and determines how many consecutive 32-byte directory entries are required to store the long name. This function takes into account that all long names must be followed by a short, (8.3) directory entry. Therefore, the number returned is the number of long directory entries, plus one additional directory entry to hold the short name.

**SHORT_DIR_ENTRY far * doslfn_FindSequentialDirectoryEntry (drive_number, num_entries_needed, cluster, cluster_spanned, new_cluster)**
char drive_number;
WORD num_entries_needed;
CLUSTER cluster;
WORD far *cluster_spanned;
CLUSTER far *new_cluster;
Parameters:    *drive_number*
        Identifies the drive number on which to search for a block of free directory entries. Drive A:=0, B:=1, etc.
   *num_entries_needed*
        Contains the number of consecutive directory entries to allocate..
   *cluster*
        A pointer to the cluster number to begin the search (it is assumed that this cluster's data has been read into the cluster_buffer.
        This routine may modify the contents of cluster_buffer, as well as *cluster*, as it follows the FAT allocation chain during its search.
   *cluster_spanned*
        A far pointer to a variable which, on exit, will indicate if the specified *filename* spans more than one cluster's worth of directory entries. If set to TRUE (0x1), the directory entries which make up *filename*, cross a cluster boundary. In this case, the *spanned_cluster_number* parameter will be set to the cluster number which contains partial directory entries for *filename*. FALSE (0x0) indicates that *filename* fits entirely with the cluster specified by the *cluster* parameter.
   *new_cluster*
        A far pointer to a variable which, on exit, may contain the cluster number of a second cluster of directory entries. If the *cluster_spanned* parameter is set to TRUE (0x1), the directory entries for *filename* span more than one cluster. The *new_cluster* parameter is then set to the cluster number of the second cluster of directory entries. If *cluster_spanned* is FALSE (0x0) this parameter has an undefined value.
Return Value:    The Return value is a far pointer into cluster_buffer where a block of size *num_entries_needed* was found. This pointer is NULL (0x0) if an error has occurred.
Comments:    This routine searches the directory entries found in cluster_buffer looking for a consecutive number of directory entries (specified in *num_entries_needed*). Both the cluster_buffer contents and the *cluster* number may be modified during the course of this routine, as they follow, or possibly add, to the FAT allocation chain.

WORD far doslfn_WhackPath (full_path, tmp_path_component, final_component)
char far *full_path;
char far *tmp_path_component;
char far *final_component;

Parameters:   *full_path*
      A far pointer to a full path name. This path will be split into two separate pieces, the path information will be put into *tmp_path_component*, and the file/subdirectory name at the end of *full_path* will be put into *final_component*.
*tmp_path_component*
      A far pointer to a buffer where the path information (from *full_path*) will be stored. The caller is responsible for ensuring that this buffer is large enough to hold the longest possible path.
*final_component*
      A far pointer to a buffer where the file/subdirectory name (the last element from *full_path*) will be stored. The caller is responsible for ensuring that this buffer is large enough to hold the longest possible file/subdirectory name.

Return Value:   The Return value is SUCCESS (00h) if successful, otherwise a non-zero value is returned. The valid return values are as follows:
SUCCESS                  0x0     The function was successful.
GENERAL_ERROR    0xFF    The function failed.

Comments:   This routine takes the specified *full_path* and separates it into two sections. The first section is the path information leading up to, but not including, the last element in *full_path*. The second section is the file/subdirectory name at the end of *full_path*. The path information is stored in the buffer pointed to by *tmp_path_component*, and the file/subdirectory name information is stored in the buffer pointed to by *final_component*.

WORD far doslfn_WalkPath (path, cluster_number, dirptr)
char far *path;
CLUSTER far *cluster_number;
SHORT_DIR_ENTRY far * far *dirptr;

Parameters:   *path*
      A far pointer to the full path that we want to "walk down". Since *path* may contain long subdirectory names, we cannot assume that DOS can access all of the elements in the path. Because of this DOS limitation, this routine is responsible for "walking the path". It manually finds each element in the path and returns the *cluster_number* and *dirptr* of the final element in the path.
*cluster_number*
      A far pointer to a variable which will be set to the cluster number associated with the final element in *path*. (This cluster number will reference the cluster which contains the directory entry for the final element in *path*.)
*dirptr*
      A far pointer to the caller's far pointer. This parameter is not used on input. Upon exit, it points to the spot in the cluster_buffer where the directory entry for the final element in *path* is located.
      If an error occurs, this value is undefined and must not be accessed.

Return Value:   The Return value is SUCCESS (00h) if successful, otherwise a non-zero value is returned. The valid return values are as follows:
SUCCESS                  0x0     The function was successful.
ERROR_READ_FAULT  0x1E    An error occurred reading from the disk.
GENERAL_ERROR    0xFF    The function failed.

| | Comments: | This function "walks down" the path specified by the *path* parameter. |
|---|---|---|
| | | Since *path* may contain long subdirectory names, we cannot assume that DOS can access all of the elements in the path. This routine manually finds each element in the path. It returns the *cluster_number* containing the directory entry for the final element in *path*, |
| 5 | | as well as a pointer to the spot in the cluster_buffer where the final element in *path* is located. |
| | | This routine may modify the contents of the cluster_buffer as it follows the FAT allocation chain during its search |
| 10 | | |

```
WORD far doslfn_DeleteFileNoPathWalk (drive, file_name, cluster_number)
char drive_number;
char far *file_name;
CLUSTER far *cluster_number;
```

| 15 | Parameters: | *drive_number* |
|---|---|---|
| | | Identifies the drive number on which to search for a block of free directory entries. Drive A:=0, B:=1, etc. |
| | | *file_name* |
| 20 | | A far pointer to an ASCIIZ string which contains the file name to delete. |
| | | *cluster_number* |
| | | A far pointer to the cluster number which contains the directory entry for *file_name*. The cluster contents are expected to be in the cluster_buffer. |
| | Return Value: | The Return value is SUCCESS (00h) if successful, otherwise a non-zero value is returned. The valid return values are as follows: |
| 25 | | SUCCESS 0x0 The function was successful. |
| | | ERROR_WRITE_FAULT 0x1D An error occurred writing to the disk. |
| | | ERROR_READ_FAULT 0x1E An error occurred reading from the disk. |
| | | GENERAL_ERROR 0xFF The function failed. |
| | Comments: | This function deletes the file specified in the *file_name* parameter. This function |
| 30 | | is similar to the doslfn_DeleteFile() function, but is optimized for those internal routines which already have already "walked the path" using doslfn_PathWalk(), and have a valid cluster number for the directory entry referencing *file_name*. |

```
WORD far doslfn_GenerateShortname (path, long_file_name, short_file_name)
```
| 35 | | |
|---|---|---|

```
char far *path;
char far *long_file_name;
char far *short_file_name;
```

| | Parameters: | *path* |
|---|---|---|
| 40 | | A far pointer to the path to where the final long file or directory resides. This path must NOT include the directory name |
| | | *long_file_name* |
| | | A far pointer to the long file or directory name. The short file/directory name will be generated from this long name. |
| | | *short_file_name* |
| 45 | | A far pointer to a buffer which must be a minimum of 13 bytes long. This parameter is not used as input. This routine fills in the *short_file_name* buffer with an associated 8.3 short directory name, auto-generated based on the *long_file_name*. |
| | Return Value: | The Return value is SUCCESS (00h) if successful, otherwise a non-zero value is |
| 50 | | returned. The valid return values are as follows: |
| | | SUCCESS 0x0 The function was successful. |
| | | ERROR_READ_FAULT 0x1E An error occurred reading from the disk. |
| | | GENERAL_ERROR 0xFF The function failed. |
| | Comments: | This routine takes the specified *path* and *long_file_name* and auto-generates the | associated short (8.3) file name. This short file name is then returned to the caller in the buffer *short_file_name*.

Currently this path parameter is only used in auto-generating the associated 8.3 short directory name.

Note: This functionality is not needed by our Disaster Recovery application, and not all of the auto-generation rules are implemented. It is not recommened that this feature be used at this time.

unsigned char far doslfn_CalculateChecksum (short_file_name)
char far *short_file_name;
Parameters: *short_file_name*
    A far pointer to a short file name, in DOS internal 11 byte format.
Return Value: The Return value is the checksum value based upon the *short_file_name* parameter.
Comments: This routine takes the specified *short_file_name* and from that, calculates the appropriate checksum value to put in each long name directory entry. The purpose of the checksum is discussed earlier in this document, in the section titled, "The Windows/95 File System".

WORD far doslfn_IsValidShortname (file_name)
char far *file_name;
Parameters: *file_name*
    A far pointer to a short (8.3) file name, in ASCIIZ format.
Return Value: The Return value is SUCCESS (00h) if successful, otherwise a non-zero value is returned. The valid return values are as follows:
    SUCCESS    0x0    The function was successful.
    GENERAL_ERROR    0xFF    The *file_name* is NOT a valid short name.
Comments: This routine takes the specified *file_name* and determines if it is a valid short (8.3) name.

WORD far doslfn_CreateTempFile (attribute, tmp_file_name)
WORD attribute;
char far *tmp_file_name;
Parameters: *attribute*
    Contains one or more of the following file attributes to be associated with the temporary file.
    0x00 - Normal file
    0x01 - Read only file
    0x02 - Hidden file
    0x04 - System file
    0x20 - Archive file
*tmp_file_name*
    A far pointer to a buffer which is used for two purposes. As an input parameter, this buffer must contain the full path to the location where the temporary file is to be created (ASCIIZ format). On output, the buffer is modified, as the temporary file name is appended to the full path.
    It is the caller's responsibility to ensure that the *tmp_file_name* buffer is large enough to be expanded to hold the temporary file name as well as the path. For example, the longest possible temporary file name is 13 characters, so the buffer needs to be 13 bytes larger than the initial path that was handed in.
Return Value: The Return value is the handle of the temporary file. If the handle is 0, it indicates that an error occurred creating the temporary file.
Comments: This routine takes the specified *path* and in that directory creates a unique, temporary file. The routine then opens that temporary file in read/write mode, and returns a handle to that open file, as well as the full path and file name of the temporary file.

```
WORD far doslfn_GetFATEntry (drive_number, cluster)
char drive_number;
CLUSTER far *cluster;
```
Parameters:   *drive_number*
                     Identifies the drive number which contains the FAT to search.
                     Drive A:=0, B:=1, etc.
              *cluster*
                     A far pointer to a cluster number, to be used as an index into the FAT.
                     Prior to exit, this parameter is modified to contain the FAT entry. The result
                     is the same for both 12-bit and 16-bit FATs, and can be one of the following:
                     0000h                   : The cluster is available.
                     FFF0h to FFF6h          : Reserved
                     FFF7h                   : Bad cluster.
                     FFF8h to FFFFh          : Last cluster of file.
                     Other value             : Cluster number of the next cluster in the chain.
                     Note: As long as the FAT is intact, and the cluster number handed into this
                     routine is a valid file or directory cluster, 0000h, FFF0h to FFF6h, and FFF7h
                     cluster numbers should not be returned.

Return Value: The Return value is SUCCESS (00h) if successful, otherwise a non-zero value is
              returned. The valid return values are as follows:
              SUCCESS               0x0    The function was successful.
              ERROR_READ_FAULT      0x1E   An error occurred reading from the disk.
              GENERAL_ERROR         0xFF   The function failed.

Comments:     This routine takes the specified *cluster* number and returns the associated entry in the
              FAT table for that cluster. This routine automatically takes into account both 12-bit and
              16-bit FATs, and will return a consistent set of FAT values irregardless of the FAT type.
              This routine only examines the first copy of the FAT. If, for some reason that is
              unreadable, we do not try the second copy.

```
WORD far doslfn_SetFATEntry (drive_number, cluster, new_value)
char drive_number;
CLUSTER cluster;
CLUSTER far *new_value;
```
Parameters:   *drive_number*
                     Identifies the drive number which contains the FAT to modify.
                     Drive A:=0, B:=1, etc.
              *cluster*
                     Contains the cluster number corresponding to the FAT entry which we want to
                     modify.
              *new_value*
                     Contains the new value (new cluster number) which we want to put into
                     FAT[cluster].

Return Value: The Return value is SUCCESS (00h) if successful, otherwise a non-zero value is
              returned. The valid return values are as follows:
              SUCCESS               0x0    The function was successful.
              ERROR_WRITE_FAULT     0x1D   An error occurred writing to the disk.
              ERROR_READ_FAULT      0x1E   An error occurred reading from the disk.
              GENERAL_ERROR         0xFF   The function failed.

Comments:     This routine takes the new cluster number, specified by *new_value* and updates
              FAT[*cluster*] to point to *new_value*. This routine automatically takes into account both
              12-bit and 16-bit FATs, and will update all copies of the FAT.

WORD far doslfn_LinkCluster (drive_number, cluster, new_cluster)

```
char drive_number;
CLUSTER cluster;
CLUSTER far *new_cluster;
Parameters:    drive_number
                   Identifies the drive number on which we want to link one cluster to another.
                   Drive A:=0, B:=1, etc.
               cluster
                   Contains the cluster number which we want to append (link) a new cluster onto.
               new_cluster
                   Contains the new cluster which has been successfully linked to cluster.
Return Value:  The Return value is SUCCESS (00h) if successful, otherwise a non-zero value is
               returned. The valid return values are as follows:
               SUCCESS                0x0    The function was successful.
               ERROR_WRITE_FAULT      0x1D   An error occurred writing to the disk.
               ERROR_READ_FAULT       0x1E   An error occurred reading from the disk.
               GENERAL_ERROR          0xFF   The function failed.
Comments:      This routine takes the specified cluster number, and links a new cluster onto the end of
               it.  The new cluster's contents will be initialized to all 0's  This routine uses
               doslfn_SetFATEntry(), which will automatically update all copies of the FAT.

void far doslfn_Convert_83_11 (short_name, dos_name)
char far * short_name;
char far * dos_name;
Parameters:    short_name
                   A far pointer to the short (8.3) name in ASCIIZ format. This name is then
                   converted to the DOS internal, 11 byte format.
               dos_name
                   A far pointer to a buffer, used to store the short_name after being converted.
                   Note: The converted name does NOT have a NULL character to terminate the
                   string, as this is not how the DOS 11-byte format is defined.
Return Value:  None.
Comments:      This routine takes the specified short_name (8.3 based name) and converts it to
               the internal DOS 11 byte format. It puts the converted name into the buffer specified by
               dos_name. It is the caller's responsibility to make sure that the dos_name buffer is a
               minimum of 11 bytes long.
               DOS 11 byte file names have the first 8 characters of the filename left justified, and
               the 3 character extension right justified within the 11 byte buffer. If no extension is
               present, spaces (20h) are used instead. Spaces (20h) are used to fill any area in
               between the first 8 characters, and the 3 character extension. No dots "." are stored
               in the filename. For example,
               8.3 DOS filename of "beavis.txt"
```

| b | e | a | v | i | s | . | t | x | t |
|---|---|---|---|---|---|---|---|---|---|

11 byte DOS internal filename of "beavis.txt"

| b | e | a | v | i | s | space | space | t | x | t |
|---|---|---|---|---|---|-------|-------|---|---|---|

8.3 DOS filename of "butthead.txt"

| b | u | t | t | b | e | a | d | . | t | x | t | NULL |
|---|---|---|---|---|---|---|---|---|---|---|---|------|

11 byte DOS internal filename of "butthead.txt"

| b | u | t | t | h | e | a | d | t | x | t |

```
void far doslfn_ConvertDOS11Name (dos_internal_name, dos_8_3_name)
char far *dos_internal_name;
char far *dos_8_3_name;
```

Parameters: *dos_internal_name*
    A far pointer to the DOS name (DOS internal 11-byte format). This name will be converted to a DOS 8.3 name. Note: This parameter does not need to have a NULL character to terminate the string, as this is not how the DOS 11-byte format is defined.

*dos_8_3_name*
    A far pointer to a buffer, used to store the *dos_internal_name* after being converted. Note: The converted name will be in ASCIIZ format.

Return Value: None.

Comments: This routine takes the specified *dos_internal_name* (DOS 11-byte format) and converts it to a DOS 8.3 name. This converted name is stored into the buffer specified by *dos_8_3_name*. It is the caller's responsibility to make sure that the *dos_8_3_name* buffer is a minimum of 13 bytes long. *dos_8_3_name* will be stored in ASCIIZ format.

We claim:

1. A method for converting files and directories from a first system to a second system, the first system utilizes a short filename convention, the second system utilizes a long filename convention, the method comprising the steps of:
   (1) calling an initializing routine;
   (2) creating at least one file using the short filename convention;
   (3) creating at least one directory using the short filename convention;
   (4) converting the at least one directory into a plurality of directories using the long filename convention; and
   (5) placing the plurality of directories onto a hard disk.

2. The method of claim 1 wherein step (1) further comprises the steps of:
   (6) allocating space on the hard disk; and
   (7) creating a temporary subdirectory on the hard disk.

3. The method of claim 2 wherein step (2) further comprises the step of:
   (8) storing the newly created at least one file in the temporary subdirectory.

4. The method of claim 3 wherein step (3) further comprises the step of:
   (9) storing the newly created at least one directory in the temporary subdirectory.

* * * * *